United States Patent
Schluchter et al.

(10) Patent No.: US 7,280,275 B2
(45) Date of Patent: Oct. 9, 2007

(54) HIGH EFFICIENCY BEAM DISTRIBUTION WITH INDEPENDENT WAVEFRONT CORRECTION

(75) Inventors: W. Clay Schluchter, Los Altos, CA (US); Ron P. Bevis, Morgan Hill, CA (US); John J. Bockman, Santa Clara, CA (US); Greg C. Felix, San Jose, CA (US); Terry E. Riener, Union City, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 162 days.

(21) Appl. No.: 11/195,545

(22) Filed: Aug. 1, 2005

(65) Prior Publication Data

US 2007/0024976 A1 Feb. 1, 2007

(51) Int. Cl.
*G02B 27/28* (2006.01)

(52) U.S. Cl. ............... 359/496; 359/497; 359/834; 362/339

(58) Field of Classification Search ............... 359/496, 359/497
See application file for complete search history.

(56) References Cited

U.S. PATENT DOCUMENTS

| 4,576,436 A | * | 3/1986 | Daniel | 385/25 |
| 6,690,513 B2 | * | 2/2004 | Hulse et al. | 359/485 |
| 7,175,332 B2 | * | 2/2007 | Tang | 362/616 |
| 2006/0001970 A1 | * | 1/2006 | Facius | 359/497 |

* cited by examiner

*Primary Examiner*—Stephone B. Allen
*Assistant Examiner*—Lee Fineman

(57) ABSTRACT

A beam distribution apparatus includes a stack of parallelogram prisms and beam-splitting coatings each located between opposing parallel faces of adjacent parallelogram prisms. The stack is mounted on an entrance face of a triangular prism. The triangular prism includes the entrance face, a reflective face, and an exit face. The reflective face has optical surfaces for shaping output beams from the stack and reflecting the output beams through the exit face.

5 Claims, 2 Drawing Sheets (Side View)

(Side View)

(Front View)

(Top View)

HIGH EFFICIENCY BEAM DISTRIBUTION WITH INDEPENDENT WAVEFRONT CORRECTION

DESCRIPTION OF RELATED ART

In many optical systems, there is a need to distribute a laser source to many outputs with the highest quality wavefront and at the lowest loss. Typically, beam distribution is achieved with some configuration of beam splitters. One-to-two beam distribution is achieved with an uncoated plate of glass that is rotated with respect to the input beam. Multiple plates can be configured to distribute multiple beams. Coatings can be added to improve efficiency. However, this approach is costly and complex. Multiple optics require multiple alignments and potentially result in an alignment and component wavefront tolerance stack up. The tolerance stack up refers to the accumulation of the imperfections in the alignment and in the individual components that produces significant deviation from the ideal performance of the assembly.

Parallel plates can be bonded together in order to minimize the tolerance stack up. Each surface can be manufactured and tested to optical surface quality, which provides a good reference surface to the next parallel plate. If the plates are at least as thick as the input beam size, and they are tilted at a large angle (e.g., 45 degrees), the reflection from each plate will be spatially separated. The spatial separation of the reflected beams is useful for beam distribution.

Assuming the application demands high mechanical stability, the beam distribution will be bonded to the rest of the optical system. When the stack is bonded to create a monolithic optical system, it becomes difficult to correct the wavefront of each distributed beam independently. The performance is thus limited by the surface figure of each optical component in the beam train.

Thus, what is needed is a beam distribution apparatus that provides independent wavefront correction for each distributed beam.

SUMMARY

In one embodiment according to the present teachings, a beam distributing apparatus includes a stack of parallelogram prisms joined along an axis and beam-splitting coatings each located between opposing parallel faces of adjacent parallelogram prisms in the stack. The stack is mounted on an entrance face of a triangular prism and provides an array of output beams to the triangular prism. The triangular prism includes the entrance face, a reflective face, and an exit face all elongated along the axis. The reflective face has exposed surfaces for shaping the output beams that originate from the stack, reflect from the reflective face, and exit through the exit face.

In another embodiment according to the present teachings, a beam distribution apparatus includes a stack of parallelogram prisms and beam-splitting coatings each located between opposing parallel faces of adjacent parallelogram prisms in the stack. The beam-splitting coatings transmit light of a first polarization and reflect a portion of light of a second polarization. The apparatus further includes retardation plates each mounted on a face of a parallelogram prism adjacent to a beam-splitting coating, and corrective reflective optics for shaping output beams each mounted on a retardation plate.

BRIEF DESCRIPTION OF THE DRAWINGS

Use of the same reference numbers in different figures indicates similar or identical elements. Figures are not drawn to scale and are for illustrative purposes only.

DETAILED DESCRIPTION

Figure 1:
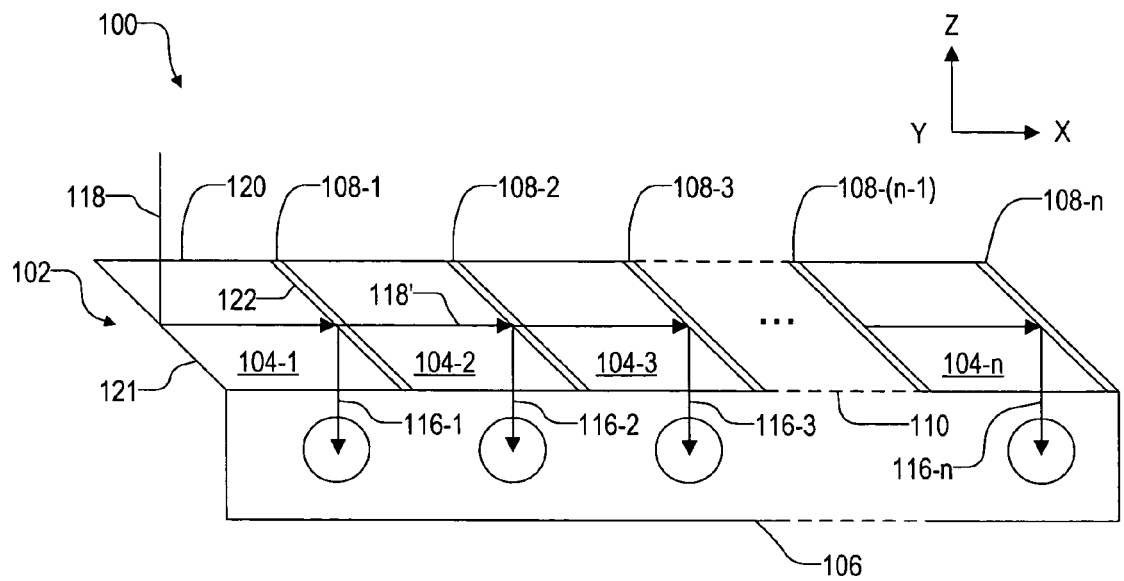
FIGS. 1, 2, and 3 respectively illustrate side, front, and top views of a beam distributing apparatus in one embodiment of the present teaching.
Figure 2:
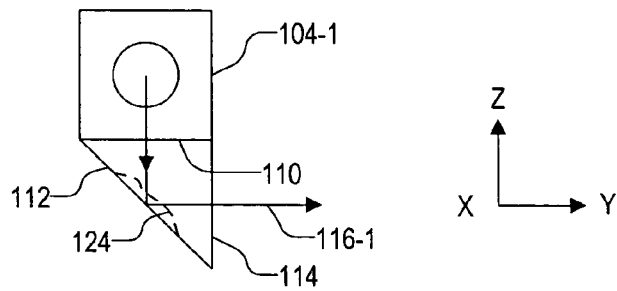
Figure 3:
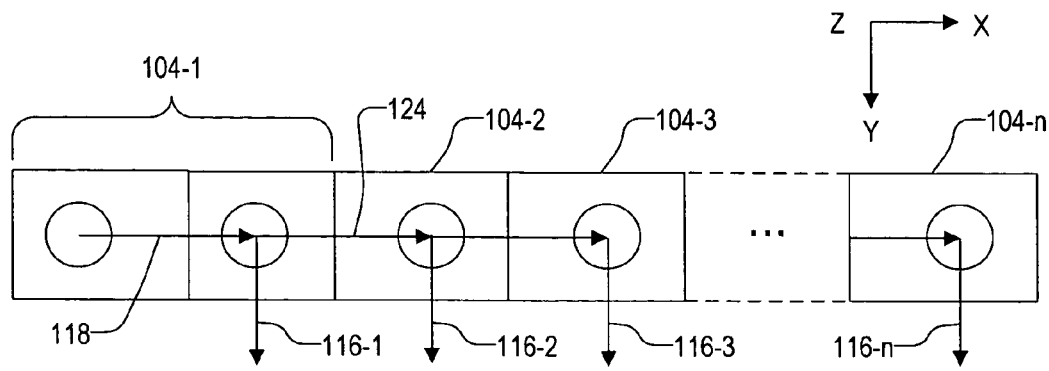

FIGS. 1, 2, and 3 respectively illustrate side, front, and top views of a beam distributing apparatus 100 in one embodiment of the present teaching. Apparatus 100 includes a stack 102 of parallelogram prisms 104-1, 104-2, 104-3 . . . 104-$n$ (where "n" is a variable equal to the number of distributed beams) mounted on a triangular prism 106. In stack 102, adjacent parallelogram prisms are joined along the X axis.

Beam-splitting coatings 108-1, 108-2, 108-3 . . . 108-$n$ are located between the opposing parallel faces between adjacent parallelogram prisms. The ratios of the reflected to transmitted light of beam-splitting coatings 108-1 to 108-$n$ are determined by the power requirement of the output light beams. Any split ratio between 0% and 100% is achievable by the design and manufacture of optical interference coatings. In one embodiment that requires equal power for the output beams, the split ratios are $1/n$ for beam-splitting coating 108-1, $1/(n-1)$ for beam-splitting coating 108-2, $1/(n-2)$ for beam-splitting coating 108-3, and so on. In one embodiment, beam-splitting coatings 108-1 to 108-$n$ are optical coatings that may be designed with one or more of the following properties: low loss, limited spectral range, and dielectric materials selection.

In one embodiment, stack 102 is made by bonding parallel plates each coated on one side with a beam-splitting film, tilting the bonded plates at 45 degrees, cutting the tops and the bottoms of the bonded plates to produce a stack with flat top and bottom surfaces, and polishing the top and the bottom surfaces of the stack. In one embodiment, prisms 104-1 to 104-$n$ are glass rhomboid prisms.

Triangular prism 106 has an entrance face 110, a reflective face 112 (FIG. 2), and an exit face 114 that extends along the X axis. Stack 102 is mounted on top of entrance face 110 of triangular prism. As will be explained later, an array of output beams will reflect from reflective face 112 and exit through exit face 114 along the Y axis. As reflective face 112 is accessible from the exterior, corresponding areas on reflective face 112 may be tailored to shape the output beams individually to ensure each output beam has the proper wavefront. In one embodiment, prism 106 is a glass right angle prism.

Apparatus 100 generates an array of output beams 116-1, 116-2, 116-3 . . . 116-$n$ from a single input light beam 118 as follows. As shown in FIG. 1, input beam 118 enters stack 102 from above along the Z axis, passes through an entrance face 120 of prism 104-1, and strikes a reflective face 121 of prism 104-1. From the incident angle of input beam 118 and the change in medium from prism 104-1 to air, reflective face 121 acts as a total internal reflection (TIR) mirror and reflects input beam 118 along the X axis onto a parallel face 122 of prism 104-1. Beam-splitting coating 108-1 on face 122 allows a part of input beam 118 to pass through (illustrated as input beam 118') and reflects another part of input beam 118 along the Z axis (illustrated as output beam 116-1).

As shown in FIG. 2, output beam 116-1 passes through entrance face 110 of triangular prism 106 and strikes reflective face 112. Reflective face 122 is a TIR mirror and reflects output beam 116-1 along the Y axis onto exit face 114. As shown in FIGS. 2 and 3, output beam 116-1 passes through exit face 114 and out of apparatus 100. FIGS. 1, 2, and 3 further illustrate that this light path is repeated for the subsequent parallelogram prisms to produce output beams 116-2 to 116-$n$. As described above, beam-splitting coatings 108-1 to 108-$n$ may be selected so that output beams 116-1 to 116-$n$ have the same optical power.

After apparatus 100 has been assembled, output beams 116-1 to 116-$n$ can be measured to determine if they have the desired wavefronts. If a wavefront is unsatisfactory, a corresponding area on reflective face 112 can be individually tailored from its exposed exterior surface to provide the desired wavefront. In one embodiment, the corresponding area is shaped with magnetorheological finishing technology of QED Technologies of Rochester, New York. This is illustrated by a dashed surface 124 on reflective face 112. Instead of shaping reflective face 112, corrective optics can be placed on the corresponding areas on reflective face 112 to provide the desired wavefronts.

Figure 4:
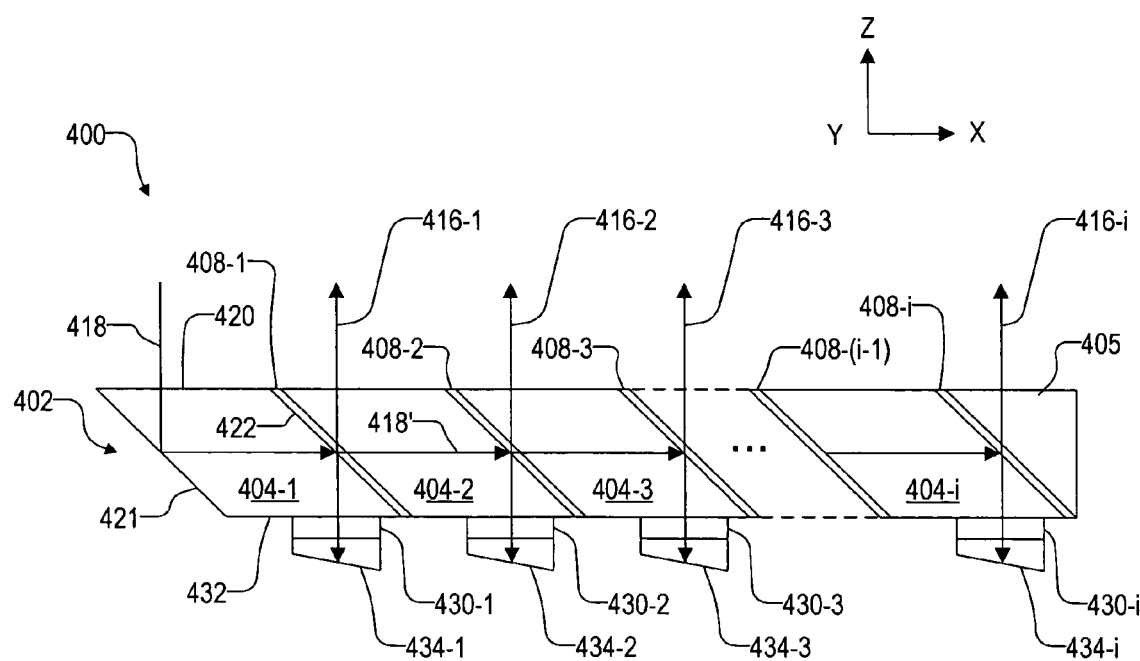
FIG. 4 illustrates a side view of a beam distributing apparatus in another embodiment of the present teaching.

FIG. 4 illustrates a beam distributing apparatus 400 in one embodiment of the present teaching. Apparatus 400 includes a stack 402 of parallelogram prisms 404-1, 404-2, 404-3 . . . 404-$i$ (where "i" is a variable equal to the number of distributed beams). In stack 402, adjacent parallelogram prisms are joined along the X axis. In one embodiment, a prism 405 is mounted to parallelogram prism 404-$i$ at the end of stack 402. Prism 405 eliminates the need for a complicated coating on parallelogram prism 404-$i$ and isolates the last output beam from environmental effect, such as beam pointing due to pressure changes. In one embodiment, prism 405 is a glass triangular prism.

Beam-splitting coating 408-1, 408-2, 408-3 . . . 408-$i$ are located between the opposing parallel faces between adjacent parallelogram prisms. In one embodiment, each beam-splitting coating substantially transmits the P-polarized light but only a portion of the S-polarized light. The ratios of reflected to transmitted S-polarized light of beam-splitting coatings 408-1 to 408-$i$ are determined by the power requirement of the output beams. Any split ratio between 0% and 100% of the S-polarization is achievable by the design and manufacture of optical interference coatings. In one embodiment that requires equal power for the output beams, the split ratios are 1/i for beam-splitting coating 408-1, 1/(i–1) for beam-splitting coating 408-2, 1/(i–2) for beam-splitting coating 408-3, and so on. In one embodiment, beam-splitting coatings 408-1 to 408-$i$ are optical coatings that may be designed with one or more of the following properties: low loss, limited spectral range, and dielectric materials selection.

In one embodiment, stack 402 is made by bonding parallel plates each coated on one side with a beam-splitting film, tilting the bonded plates at 45 degrees, cutting the tops and the bottoms of the bonded plates to produce a stack with flat top and bottom surfaces, and polishing the top and the bottom surfaces of the stack. In one embodiment, prisms 404-1 to 404-$i$ are glass rhomboid prisms.

Retardation plates 430-1, 430-2, 430-3 . . . 430-$i$ are mounted on the bottom faces of parallelogram prism 404-1 to 404-$a$, respectively. Corrective reflective optics 434-1, 434-2, 434-3 . . . 434-$i$ are mounted on retardation plates 430-1 to 430-$i$, respectively, to tailor the wavefronts of the output beams. In one embodiment, retardation plates 430-1 to 430-$i$ are quarter-wave plates and reflective optics 434-1 to 434-$i$ are mirrors.

Apparatus 400 generates an array of output light beams 416-1, 416-2, 416-3 . . . 416-$i$ from a single input light beam 418 as follows. In one embodiment, input beam 418 includes both P- and S-polarized light. Input beam 418 enters stack 402 from above along the Z axis, passes through an entrance face 420 of prism 404-1, and strikes a reflective face 421 of prism 404-1. From the incident angle of input beam 418 and the change in medium from prism 404-1 to air, reflective face 421 acts as a total internal reflection (TIR) mirror and reflects input beam 418 along the X axis onto a parallel face 422 of prism 404-1. Beam-splitting coating 408-1 on face 422 reflects a portion of the S-polarized light in input beam 418 (shown as an output beam 416-1) along the Z axis and through exit face 432. Beam-splitting coating 408-1 also transmits the remaining portion of the S-polarized light and substantially all of the P-polarized light in input beam 418 (illustrated as input beam 418') onto the next beam-splitting coating 408-2.

Output beam 416-1 passes through quarter-wave plate 430-1 and strikes reflective optics 434-1. Reflective optics 434-1 reflects output beam 416-1 back through quarter-wave plate 430 and again onto face 422. After passing twice through quarter-wave plate 430, output beam 416-1 changes from a S-polarized light to a P-polarized light. Thus, output beam 416-1 now passes through beam-splitting coating 408-1 on face 422 and exits apparatus 400. FIG. 4 further illustrates that this pattern is repeated for the subsequent parallelogram prisms to produce output beams 416-2 to 416-$i$. As described before, beam-splitting coatings 408-1 to 408-$i$ may be selected so that output beams 416-1 to 416-$i$ have the same optical power.

After apparatus 400 has been assembled, output beams 416-1 to 416-$i$ can be measured to determine if they have the desired wavefronts. If a wavefront is unsatisfactory, corresponding reflective optics 434-$i$ can be individually tailored to provide the desired wavefront. In one embodiment, the corresponding reflective optics 434-$i$ is shaped with a magnetorheologic finisher to provide the desired wavefront. Alternatively, pre-made reflective optics 434-$i$ are selected from bins of available reflective optics to provide the desired wavefront.

Various other adaptations and combinations of features of the embodiments disclosed are within the scope of the present teaching. Numerous embodiments are encompassed by the following claims.

What is claimed is:

1. A beam distributing apparatus, comprising:
a stack, comprising:
a plurality of parallelogram prisms joined along an axis;
a plurality of beam-splitting coatings, each beam-splitting coating being located between opposing parallel faces of adjacent parallelogram prisms in the stack;
wherein the stack is mounted on an entrance face of a triangular prism and provides an array of output beams to the triangular prism;
the triangular prism comprising the entrance face, a reflective face, and an exit face all extended along the axis, wherein the reflective face comprises areas for shaping the output beams that originate from the stack, reflect from the reflective face, and exit through the exit face.

2. The apparatus of claim 1, wherein the parallelogram prisms comprise rhomboid prisms.

3. The apparatus of claim 2, wherein the triangular prism comprises a right angle prism and the reflective face comprises a hypotenuse face.

4. The apparatus of claim 1, wherein:
the stack comprises at least:
a first prism comprising another entrance face, a first angled face, and a second angled face;
a second prism comprising a third angled face and a fourth angled face;
a beam-splitting coating between the second and the third angled faces;
in a first beam path, a portion of an input beam that forms a first output beam enters the another entrance face, reflects from the first angled face, reflects from the beam-splitting coating between the second and the third angle faces, enters the entrance face of the triangular prism, reflects from a first area on the reflective face tailored for the first output beam, and exits through the exit face; and
in a second beam path, another portion of the light beam that forms a second output beam passes through the beam-splitting coating between the second and the third angled faces, reflects from the fourth angled face, enters the entrance face, reflects from a second area on the reflective face tailored for the second output beam, and exits through the exit face.

5. The apparatus of claim 1, wherein the beam-splitting coatings include split ratios of $1/n$, $1/(n-1)$, $1/(n-2)$, and so on where n is a variable equal to a number of the output beams.

* * * * *